United States Patent Office 3,277,014
Patented Oct. 4, 1966

3,277,014
EMULSIFIER COMPOSITIONS
Louis A. Joo, Crystal Lake, and Walter E. Kramer, Niles, Ill., assignors, by mesne assignments, to Union Oil Company of California, Los Angeles, Calif., a corporation of California
No Drawing. Filed Aug. 27, 1962, Ser. No. 219,785
11 Claims. (Cl. 252—356)

This invention relates to new toxicant compositions of improved stability for use in combatting pests, bacteria and parasites. More particularly, this invention relates to insecticidal, herbicidal, fungicidal, rodenticidal, disinfectant, and germicidal compositions containing:

(1) A halogenated hydrocarbon toxicant;
(2) A hydrocarbon solvent; and
(3) A stabilizer comprising certain fractions of complex carboxylic acids or their monomeric esters derived from complex sulfur-containing aromatic compounds of petroleum origin, i.e., solvent extracts obtained in the solvent refining of mineral lubricating oils and related sulfur containing starting materials such as hydrogenated solvent extracts, FCC recycle stock and decant oil. The acids are prepared by metalation of said aromatic compounds to form the adduct, carbonation of the adduct to form the salt of the corresponding mixed mono-, di- and polycarboxylic acids, acidification of the salt mixture to form the free acids, and fractionation of the acid mixture to obtain acids which are predominantly monocarboxylic in nature.

This invention is based on the discovery that the complex monocarboxylic acids, or fractions containing not less than about 80% by weight of monocarboxylic acids and/or the monomeric esters of said monocarboxylic acids or fractions, prepared from certain sulfur-containing starting materials of petroleum origin as hereinafter more definitely defined, quite unexpectedly stabilize hydrocarbon solvent solutions of halogenated hydrocarbon toxicants, such as DDT, and prevent or delay the precipitation of the toxicants from the solvent for lengths of time sufficient for commercial application. Furthermore we have found that the herein defined selected fractions of complex carboxylic acids or their monomeric esters or mixtures of the acids and esters are more effective as stabilizers for halogenated hydrocarbon toxicants in hydrocarbon solvent solutions than certain of the known prior art stabilizers. In addition, the stabilizers of this invention are effective at lower concentrations than the known prior art stabilizers and do not have the deleterious side effects which are characteristic of some of the prior art stabilizers now in use.

The number of organic toxicant compositions now in use for household, industrial and agricultural purposes is increasing. Many of the biocides or toxicants used are water-insoluble, and accordingly are prepared in concentrated solutions in other solvents for emulsification with water at the rate of application. Halogenated hydrocarbon toxicants, such as chlorinated hydrocarbons like DDT, are prepared and shipped in concentrated hydrocarbon solvent solutions and diluted or emulsified for the end use. In preparing such emulsions or solutions, various types of surface active and detergent agents are used to aid in holding the toxicant in solution and enhancing its usefulness. However, throughout this art there is the constant problem of the stability of the concentrated hydrocarbon solution of the concentrate, and, although certain stabilizers are known and used, their ability to enhance the stability, postpone precipitation of the toxicant, and readily form dilute aqueous emulsions is varied and subject to a number of limitations, known to those skilled in this art.

According to the prior art, a halogenated hydrocarbon toxicant, such as DDT (dichlorodiphenyltrichloroethane) is applied as a solution or emulsion of low concentrations, i.e., about 5% by weight (Muller, U.S. Patent 2,329,074, now Re. 22,700; Siegler, U.S. Patent 2,358,942). For purposes of storage and transportation, such a toxicant is prepared in more concentrated solutions in a hydrocarbon solvent, generally a saturated solution, for economic reasons. However, because of the diverse nature of the toxicants, differences in the properties of the stabilizers, and differences in solubilities, compatibilities and environments, the selection of the proper stabilizer is empirical, and the problem of concentrate stability during handling, shipping and storage persists because the selected stabilizers of the prior art have limited application or lack versatility.

This is a particularly troublesome problem when handling or shipping hydrocarbon concentrates of DDT and related halogenated hydrocarbon toxicants. Although a gas oil, for example, will dissolve 25 to 30% by weight of DDT at room temperature, the solution is unstable and deteriorates at lower temperatures during storage, handling or shipping in the winter months. Under these conditions, the DDT slowly precipitates, generally over relatively extended periods of time, depending on the severity of the cold, and, unfortunately, this precipitate does not readily redissolve when the concentrate is warmed to normal temperatures. Peculiarly, the DDT precipitates in excess of the quantity required to form a saturated solution at the lowered temperature and a large quantity of of DDT is not precipitated as soon as the saturation temperature is passed or even after "seeding" by initial crystal formation occurs. The precipitation and deterioration of the concentrate is slow and substantially continuous over a period of many hours.

Such well-known compounds as stearic acid, palmitic acid, lower fatty acids and the proprietary compositions, "Paraflow" and "Santapour" do not offer sufficient protection from this deterioration of the concentrates. Other products reduce the effectiveness of the toxicant or have deleterious side effects on plant foliage and the skin. By using the complex monocarboxylic acids and/or their monomeric esters or partial esters, described herein, in amounts ranging from about 0.5 to 10% by weight, as stabilizers or emulsifiers, the foregoing difficulties are mitigated or eliminated.

Accordingly, it becomes a primary object of this invention to provide stable toxicant compositions containing halogenated hydrocarbon toxicants dissolved in a hydrocarbon vehicle and containing a stabilizing amount of certain complex monocarboxylic acids, or their monomeric esters, derived from solvent extracts obtained in the solvent refining of mineral lubricating oils and related sulfur-containing starting materials by metalation, carbonation, acidification and fractionation.

An object of this invention is to provide stable toxicant compositions containing halogenated hydrocarbon toxicants, a hydrocarbon vehicle, and between about 0.5 to 10% by weight of selected fractions of complex carboxylic acids and/or the monomeric esters thereof as herein more particularly defined.

Another object of this invention is to provide stable toxicant compositions containing chlorinated hydrocarban toxicants, a hydrocarbon vehicle, and between about 0.5 to 10% by weight of complex monocarboxylic and/or dicarboxylic acids derived from sulfur-containing aromatic hydrocarbons or petroleum origin.

Another object of this invention is to provide stable toxicant compositions containing chlorinated hydrocarbon toxicants, a hydrocarbon vehicle, and between about 0.5 to 10% by weight of monomeric esters of complex monocarboxylic and/or dicarboxylic acids derived from sulfur-containing aromatic hydrocarbons of petroleum origin.

Still another object of this invention is to provide concentrated solutions of DDT in hydrocarbon solvents which are stabilized against precipitation by the incorporation of effective amounts of certain fractions of complex carboxylic acids, or monomeric esters of said carboxylic acids, derived from solvent extracts obtained in the solvent extraction of mineral lubricating oils, using a solvent selective for aromatic compounds, or derived from hydrogenated solvent extracts or from FCC recycle stock.

A feature of this invention is the discovery that the incorporation of the stabilizers disclosed herein with a hydrocarbon solvent forms a stable emulsifier composition for toxicants.

These and other objects of this invention will be described or become apparent as the specification proceeds.

THE TOXICANTS

The toxicants used in the compositions of this invention have the formula $$\text{H} - \underset{Z}{\overset{Y}{\text{C}}} - \text{CX}_3$$

where X represents a halogen that is chlorine, bromine, or iodine, or mixtures of same, and Y and Z each represent a radical of the group consisting of monovalent aliphatic, aryl, and aralkyl radicals of the benzene series. Examples of aliphatic or alkyl radicals coming within the foregoing definition are those containing 1 to 20 carbon atoms, that is, methyl, ethyl, propyl, isopropyl, butyl, isobutyl, t-butyl, amyl, isoamyl, hexyl, heptyl, octyl, nonyl, decyl, undecyl, dodecyl, tridecyl, tetradecyl, pentadecyl, hexadecyl, heptadecyl, octadecyl, nonadecyl and eicosyl. Examples of aryl radicals are phenyl, naphthyl and anthryl radicals, and the aralkyl radicals may be combinations of the foregoing defined aryl and alkyl radicals.

The best-known species coming within this definition is dichlorodiphenyltrichloroethane (commonly referred to as DDT). Other examples of toxicants coming within the formula or within the definition of toxicants that can be used in accordance with this invention are: bis(methoxyphenyl)trichloroethane) dichlorodiphenyldichloroethane; benzenehexachloride; 1,2,4,5,6,7,8-octachloro-4,7-methano-3a,4,7,7a-tetrahydroindane, known commercially as Chlordane; polychlorobicyclicterpenes; the gamma isomer of 1,2,3,4,5,6-hexachlorocyclohexane, known commercially as Lindane; 1,2,3,4,10,10-hexachloro-1,4,4a-5,8,8a - hexahydro - 1,4,5,8 - dimethanenaphthalene, known commercially as Aldrin; 1,2,3,4,10,10-hexachloro-6,7-epoxy - 1,4,4a,5,6,7,8,8a - octahydro - 1,4,5,8 - dimethanenaphthalene, known commercially as Dieldrin; and 1,1,1-trichloro - 2,2 - bis(p - methoxyphenyl)ethane, known commercially as Methoxychlor; the following herbicides: (2,4-dichlorophenoxy)acetic acid and its derivatives such as the esters and salts, known commercially as 2,4–D; (2,4,5-trichlorophenoxy)acetic acid and its derivatives such as the esters and salts, known commercially as 2,4,5–T; and N-(trichloromethylmercapto)phthalimide; the fungicides: bis(dimethylthiocarbonyl)disulfide and pentachlorophenol; and the germicide cetyl trimethyl ammonium bromide.

The invention is intended to include diphenyl haloethanes, which possess insecticidal properties, and includes ethanes having two or three chlorine or bromine atoms on one of the ethane carbon atoms. The other ethane carbon atom carries two phenyl groups which may be unsubstituted or substituted and may be alike or different.

Typical diphenyl haloethanes are, 1,1,1-trichloro-2,2-bis(chlorophenyl)ethane;
1,1,1-tribromo-2,2-bis(chlorophenyl)ethane;
1,1,1-trichloro-2,2-bis(fluorophenyl)ethane;
1,1,1-trichloro-2,2-bis(bromophenyl)ethane;
1,1-dichloro-2,2-bis(bromophenyl)ethane;
1,1-dichloro-2,2-bis(chlorophenyl)ethane;
1,1-dichloro-2,2-bis(fluorophenyl)ethane;
1,1,1-trichloro-2,2-bis(chlorotolyl)ethane;
1,1,1-trichloro-2,2-diphenylethane;
1,1,1-trichloro-2,2-ditolylethane;
1,1,1-trichloro-2,2-di(ethylphenyl)ethane;
1,1-bis(acetylphenyl)-2,2,2-trichloroethane;
1,1-dichloro-2,2-ditolylethane;
1,1,1-trichloro-2,2-di(ethylphenyl)ethane;
1,1,1-trichloro-2-phenyl-2-chlorophenylethane;
1,1,1-trichloro-2-tolyl-2-chlorophenylethane;
1,1,1-tribromo-2,2-tolylethane;
1,1,1-trichloro-2,2-bis(chloronitrophenyl)ethane;
1,1,1-trichloro-2,2-bis(methoxyphenyl)ethane
1,1,1-tribromo-2,2-bis(methoxyphenyl)ethane;
1,1,1-trichloro-2,2-bis(ethoxyphenyl)ethane;
1,1,1-trichloro-2-chlorophenyl-2-methoxyphenyl ethane;
1,1-dichloro-2-bromophenyl-2-methoxyphenylethane;
1,1-thiocyanophenyl-2,2,2-trichloroethane, and the like. The substitutents of the phenyl rings may be in ortho, meta, or para positions. The actual materials of commerce usually consist of a mixture of isomers.

Any of the foregoing toxicants, particularly the halogenated hydrocarbon type, such as DDT and related compounds, in substantially saturated or supersaturated solution in a hydrocarbon or petroleum solvent, are stabilized without deleterious effects by incorporating about 0.5% to 10% by weight of fractions of the following described complex carboxylic acids, or the monomeric esters thereof as hereinafter defined.

THE COMPLEX ACID STABILIZERS

The stabilizers used in this invention are prepared from mixtures of mono-, di- and polycarboxylic acids having from 1 to 7 carboxyl groups per molecule, resulting from reacting a sulfur-containing aromatic hydrocarbon of petroleum origin with an alkali metal to form the alkali metal adduct, reacting the alkali metal adduct with carbon dioxide under conditions to form the alkali metal salt of the corresponding carboxylic acids, acidifying the resulting complex salts to form the mixture of free carboxylic acids, and fractionating the mixture of acids to separate a fraction which is predominantly (80% to 100%) monocarboxylic in nature, from the mixed mono- and dicarboxylic, or predominantly dicarboxylic acids. Alternately the fractionation, as herein subsequently described, can be preformed using the alkali metal salt mixture.

The methods used in preparing the mixture of complex carboxylic acids, from which selected fractions are prepared for use in accordance with this invention, are described in detail in the following copending applications:

| Serial No. | Filing Date | Inventors |
|---|---|---|
| [1] 819,932 | 6-12-59 | T. W. Martinek. |
| 79,661 | 12-30-60 | W. E. Kramer et al. |
| 160,882 | 12-20-61 | T. W. Martinek. |

[1] Now U.S. Patent 3,153,087.

The starting material for the metalation, carbonation and acidification reaction comprises sulfur-containing aromatic materials of the group consisting of solvent extracts obtained in the solvent extraction of mineral lubricating oils by treatment with a solvent selective for aromatic compounds, hydrogenated solvent extracts or otherwise refined solvent extracts, FCC recycle stock, and decant oil from FCC processes and mixtures of these source materials. Of these starting materials, the solvent extracts and the hydrogenated solvent extracts are preferred. These materials result from the treatment of mineral lubricating oils with a solvent selective for aromatic materials for the purpose of separating non-aromatic hydrocarbons (the raffinate and finished oil) from the aromatic hydrocarbons (the extract or waste product).

The final process of refining mineral lubricating oils by means of solvent extraction to produce the raffinate finished oil and the solvent extract waste product is well known and described in detail in the foregoing copending applications. In addition, these copending applications set forth in detail the physical and chemical characteristics of a large number of specific solvent extracts from different sources, using different solvents, that may be used as a starting material. Accordingly, for purposes of this invention, it is only necessary to describe and disclose the final physical and chemical properties of these materials.

In general, solvent extracts and hydrogenated solvent extracts have the characteristics set forth in Table I.

TABLE I.—CHARACTERISTICS OF SOLVENT EXTRACT STARTING MATERIALS

| Characteristic: | Range of value |
|---|---|
| Gravity, ° API | 7.3–18.3 |
| Gravity, Sp., 60/60° F. | 0.9446–1.0195 |
| Viscosity, SUS @ 210° F. | 40–1500 |
| Viscosity index | −153–39 |
| Pour Point (max.), ° F. | 20–115 |
| Color NPA | 2–5D |
| Molecular wt., ave. (above 300) | 320–750 |
| Sulfur, percent wt. | 1.9–4.5 |
| Aromatic Compounds (incl. heterocyclics) | 75–98 |
| Av. No. of aromatic rings/mean arom. mol. | 1.7–3.5 |

The most important chemical properties depended upon to define these materials and the complex carboxylic acids derived therefrom are the average molecular weight, the weight percent of sulfur and the average number of aromatic rings per mean aromatic molecule.

The complexity of the types of compounds present in solvent extracts which are carried into and characterize the carboxylic acids and esters derived therefrom, as based upon the analyses of several of the species of extracts described in detail in said copending applications, illustrated by the following Table II.

TABLE II.—ESTIMATED CHEMICAL COMPOSITION OF SOLVENT EXTRACTS

| Type of compound: | Approx. percent in the extract |
|---|---|
| Saturated hydrocarbons | 12.5 |
| Mononuclear aromatics— | |
| Substituted benzenes | 25.0 |
| Dinuclear aromatics— | |
| Substituted naphthalenes | 30.0 |
| Trinuclear aromatics— | |
| Substituted phenanthrenes | 10.0 |
| Substituted anthracenes | 5.0 |
| Tetranuclear aromatics— | |
| Substituted chrysenes | 00.5 |
| Substituted benzphenanthrenes | 0.2 |
| Substituted pyrenes | 0.2 |
| Pentanuclear aromatics— | |
| Perylene | 0.01 |
| Sulfur compounds,[1] oxygen compounds, etc. | 16.5 |

[1] Mainly heterocyclic compounds.

Any portion of the reactive aromatic constituents in solvent extracts or other sources may be isolated therefrom, to be used as starting materials for the metalation, carbonation and acidification reactions to prepare the complex carboxylic acids used in accordance with this invention. For example, solvent extracts may be distilled and selected fractions thereof used as the starting materials. The content of reactive, complex, polynuclear, aromatic compounds and heterocyclics present in solvent extracts, as illustrating the preferred source material, may vary depending on the type of solvent, the extract process applied, and the mineral oil treated, although the general types of compounds present in the the extract are not so varied. Extracts containing from about 30% to 90% of polynuclear aromatics and heterocyclics of aromatic nature represent a preferred type of starting material for economic reasons.

In addition to the general physical and chemical properties of the solvent extracts given in Tables I, II and III, these starting materials may be further characterized by the fact that their boiling point (initial) is between 300 to 1000° F., the end-boiling-point is between 400 and 1210° F., and they may exhibit pour points as high as 100° F. Chemically, the extracts may contain about 1.9 to 4.9% wt. of sulfur, present mainly as heterocyclic rings, and 0.01 to 0% by wt. nitrogen and/or oxygen, also present in heterocyclic rings. On a volume basis, the extracts may contain from about 15% to 50% of sulfur compounds, and 30% to 90% of complex aromatic and thio compounds. Many of these characteristics, particularly the chemical characteristics, carry over into the complex carboxylic acids prepared therefrom.

The solvent extract starting material may be vacuum-distilled, dewaxed and/or clay-contacted and/or hydrogenated prior to use in preparing the complex carboxylic acids from which the selected fractions used in accordance with this invention are derived. Dewaxing can be accomplished by known methods, e.g., treatment with 45% MEK and 55% toluene as the dewaxing solvent, using temperatures in the order of −10° F., and solvent/solvent extract ratios of about 8/1. This treatment results in a dewaxed extract which has a pour point of about +5° F., and results in the removal of about 2% wax having a melting point of about 130° F. Clay-contacting can be accomplished by known methods.

The preparation of hydrogenated extracts is accomplished using known methods of hydrogenation, particularly mild hydrogenation; thus, a preferred method of preparing hydrogenated extracts is to hydrogenate the distillate lube oil or residual oil before the extraction by treatment with hydrogen at 100–500 p.s.i.g., using temperatures of 530–600° F., in the presence of a molybdenasilica-alumina catalyst. This same method can be applied to the solvent extracts per se, that is, after their separation from the raffinate. Hydrogenation has been found to result in the decarboxylation of any naphthenic acids present and the production of an extract from which complex acids of enhanced properties can be obtained by metalation, carbonation, acidification and fractionation.

Other known methods of hydrogenation can be applied to the solvent extracts using such catalysts as Filtrol, cobalt-molybdate, silver-molybdate and Porocel. The characteristics of a representative hydrogenated, dewaxed, and clay-contacted solvent extract are: °API, 9.5; color, NPA, 7; flash (COC), 420° F.; fire (COC), 465° F.; pour point, −5° F.; vis @ 100° F., 1075 SUS; vis @ 210° F., 58.5 SUS; VI, −96; Neut. No. (1948), 0.05; sulfur, 2.60 wt. percent and C.R. percent, 0.01. The FCC recycle stock is illustrated by the 19% extract (phenol solvent) of FCC recycle stock, which extract had the following properties: ° API, 1.8; sulfur, 1.9 wt. percent; Br. No., 17; RI (20° C.) 1.6372 and Engler distillation,

—IBP=589° F.

90%=745° F. The use of these latter starting materials is described in U.S. Patent 3,153,087. The preparation and properties of FCC recycle Stock and decant oil are described in copending application Ser. No. 242,076, filed Dec. 4, 1962. The latter has a boiling range of about 375° to 995° F. and contains about 0.87 wt. percent sulfur.

The mixed complex carboxylic acids are prepared from the foregoing starting materials by reacting same with a sufficient amount of, and preferably an excessive amount of a metal of group IA of the Periodic Chart of Atoms, Hubbard, 1941, that is, sodium, potassium, lithium, rubidium, or cesium, at a temperature of about −60° C. to 115° C., at atmospheric or superatmospheric pressures, and with a reaction solvent such as the dialkyl glycol ethers, dimethyl glycol ether, methyl alkyl ethers, dimethyl ether, tetrahydrofuran, dioxane, trimethylamine, methylal and mixtures thereof, to form the alkali metal adduct. This metalation reaction is sometimes difficult to initiate and shearing, the preparation of a preformed dispersion of the alakali metal in the starting material, and the use of excess amounts of alkali metal, are some of the expedients described in said copending applications to increase the yield of acids by unit weight of alkali metal consumed.

Following the adduct formation, the reaction mixture (which is now colored violet to blue) is carbonated by reaction with gaseous or solid carbon dioxide at temperatures ranging from −50° C. to 115° C. This results in dissipation of the color and formation of the alkali metal salts of the corresponding mono-, di- and poly-carboxylic acids. Further washing separates the water soluble salts from the solvent phase, and acidification with a mineral acid frees and precipitates the complex mixture of acids.

This initial reaction product is illustrated by Examples I and II, Experiments 1 through 21 of Table II in abandoned application Serial No. 819,932, and is also illustrated by the Runs 12 through 47 described in U.S. Patent 3,153,087. Any of these mixtures of complex acids can be used as the source of monocarboxylic acids or their esters to be used as stabilizers in accordance with this invention. In order to further illustrate this source material, a number of specific examples are given, in Table III.

The exclusion of those acids having two or more carboxyl groups per molecule, and having acid numbers above 200, and preferably above about 180, to form fractions having acid numbers in the range of about 100 to 200 and preferably 100–180, is accomplished by means of fractionation. The detailed procedures for carrying out the fractionation of the mixed acids is described in detail in the copending applications:

| Serial No. | Filing date | Inventors |
|---|---|---|
| 161,355 | 12-22-61 | L. A. Joo et al. |
| [1] 209,741 | 7-13-62 | L. A. Joo. |
| 247,358 | 12-26-62 | L. A. Joo et al. |

[1] Now abandoned.

In accordance with application Serial No. 161,355, fractions of the complex acids are separated in accordance with their acid numbers and the number of carboxyl groups per molecule by (1) dissolving the salts of the acids to be fractionated in a first solvent in which the free acids are at most only sparingly soluble; (2) adding a small amount of an acid sufficiently strong to liberate a portion of the desired acids; (3) extracting the liberated acids from the resulting mixture using a second solvent which is immiscible with said first solvent; (4) adding another small amount of mineral acid to the remaining salt solution; (5) again extracting the acids thus liberated with said solvent; and (6) continuing this cyclic acidification and extraction until the first solvent is substantially free of the desired acids and their salts. The process is illustrated as follows:

*Example I*

A water solution containing 26 g. of the sodium salts of "extract acids" per 100 ml. was prepared, a 150-ml. portion of it was treated with 1 ml. of hydrochloric acid, and the resulting liberated acid was extracted TABLE III.—TYPICAL PROPERTIES OF MIXTURES OF COMPLEX CARBOXYLIC ACIDS DERIVED FROM SOLVENT EXTRACTS

| No. | Acid Value | Mol. Wt. | Percent S | Br. No. | Percent Unsap. | Eq. Wt. | Eqs./Mol. | Acid No. |
|---|---|---|---|---|---|---|---|---|
| 1 | 171 | 686 | | | | 328 | | |
| 3 | 323 | 600 | 3.0 | | | 173 | | |
| 4 | 287 | 750 | 1.85 | | | 195 | 3.8 | |
| 7 | 272 | 940 | 2.07 | | | 206 | 4.6 | |
| 24 | | | 1.9 | 20 | 4.4 | | | 304 |
| 31 | | | 3.2 | 22 | 6.4 | | | 242 |
| 38 | | 390 | | | 9.5 | | | 163 |
| 39 | | 375 | | | 7.4 | | | 200 |
| 40 | | 375 | | | 8.7 | | | 211 |
| 46 | | 390 | | | 4.2 | | | 197 |
| 49 | | 365 | | | 5.4 | | | 218 |
| 51 | | 455 | | | 5.5 | | | 186 |
| 53 | | 385 | | | 2.5 | | | 255 |
| 54 | | 380 | | | 6.4 | | | 216 |
| 60 | | 375 | | | 3.2 | | | 196 |
| 63 | | 345 | | | 4.0 | | | 202 |
| 71 | | | | | 4.2 | | | 233 |
| 8 | | | | | | | | 73 |
| 101 | | 405 | | | 9.0 | | | 168 |

Certain of the foregoing mixtures of acids are already predominantly monocarboxylic i.e. 80% or more or contain a mixture which predominates in the mono- and di-carboxylic acids with only small amounts of higher acids. This is illustrated by those acids having acid numbers in the order of 120 to 200, that is, acid sample numbers 38, 46, 51, 60 and 101, which accordingly would not have to be fractionated prior to use in accordance with this invention.

with 20 ml. of toluene (Fraction 1, Table IV). Then the acidification with hydrochloric acid and the extraction were repeated in cyclic fashion, until no more acid was obtained from the water phase. After the "extract acid" had reached an acid number of 220 (Fraction 6, Table IV), the extraction solvent was changed to ether, since the higher-acid-number acids are insoluble in toluene. The results of the procedure are given in Table IV.

TABLE IV

Original "Extract Acid":
- A.N. _____ 218
- Mol. wt. _____ 420
- Percent unsap. _____ 8.7
- —COOH/mol. _____ 1.66

| Fraction No. | Amount (g.) | Acid No. | Mol. Wt. | —COOH/Mol. |
|---|---|---|---|---|
| 1 | 4.84 | 77 | 424 | 0.60 |
| 2 | 5.53 | 119 | | |
| 3 | 4.81 | 122 | 400 | 0.80 |
| 4 | 4.59 | 107 | | |
| 5 | 5.46 | 163 | 400 | 1.40 |
| 6 | 2.08 | 217 | | |
| 7 | 1.62 | 298 | 400 | 2.10 |
| 8 | 0.70 | 282 | | |
| 9 | 1.33 | 342 | 390 | 2.20 |
| 10 | 1.52 | 344 | | |
| 11 | 2.18 | 389 | 385 | 2.80 |
| 12 | 0.28 | 403 | | |

TABLE V

Original "Extract Acid":
- A.N. _____ 218
- Mol. wt. _____ 420
- Percent unsap. _____ 8.7
- —COOH/mol. _____ 1.66

| Fraction No. | Amount (g.) | Acid No. | Mol. Wt. | —COOH/Mol. |
|---|---|---|---|---|
| 1 | 0.99 | 39 | 475 | 0.33 |
| 2 | 2.72 | 104 | | |
| 3 | 3.72 | 128 | 405 | 0.92 |
| 4 | 3.96 | 143 | | |
| 5 | 3.66 | 152 | 400 | 1.10 |
| 6 | 3.07 | 157 | | |
| 7 | 3.07 | 161 | | |
| 8 | 2.81 | 175 | 400 | 1.25 |
| 9 | 2.62 | 167 | | |
| 10 | 3.09 | 195 | 440 | 1.50 |
| 11 | 2.37 | 191 | | |
| 12 | 2.89 | 247 | 415 | 1.83 |
| 13 | 2.46 | 271 | | |
| 14 | 2.47 | 285 | | |
| 15 | 2.20 | 325 | 400 | 2.30 |
| 16 | 2.12 | 408 | 430 | 3.13 |
| 17 | 0.45 | 406 | | |

Example II

In this example, the same stock solution was used as in Example I but ether was used as the extraction solvent from the beginning. First, 150-ml. portion of the "extract acid" salt solution was extracted with 20 ml. of ether. Then 5 ml. of concentrated hydrochloric acid and 10 ml. of water were added to the ether solution, and the resulting acidic water phase was separated from the ether phase, containing "free extract acid," and combined with the raffinate phase from the previous ether extraction step. After the water phases had been combined, they were extracted again with ether, the ether solution was acidified with 1 ml. of concentrated hydrochloric acid and 10 ml. of water, and the water phase was again separated from the ether phase, again containing "extract acid," and combined with the stock solution. This procedure was repeated until no more acid was obtained from the extract-acid-salt water solution when the solution was acidified.

The ether phases were washed twice with 10-ml. portions of water, and then the ether was evaporated to leave the acid fractions as products. These acid fractions had higher acid numbers than the fractions obtained by the method used in Example I indicating that some acid salt had been extracted along with the acids in Example I. The results of this method are given in Table V.

Fractions 1 through 5 of Table IV and fractions 1 through 10 of Table V are illustrative of species of substantially monocarboxylic acids that can be used in accordance with this invention.

The desired fractions of mixed complex carboxylic acids are prepared in accordance with abandoned application Ser. No. 209,741 by (1) dissolving the free acid mixture to be fractionated in a first solvent in which the mixture is readily soluble; (2) adding a small amount of an aliphatic solvent to precipitate or liberate a portion of the desired acids; (3) filtering the liberated acids from the resulting mixture; (4) adding another small amount of said aliphatic solvent to the remaining acid mixture solution; (5) again filtering the acids thus liberated; and (6) continuing this cyclic precipitation and filtration until the solute consists primarily of monobasic acids and the desired di, tri-, and tetracarboxylic acids have been separated. Illustrative examples from abandoned application Ser. No. 209,741 are given as follows:

Exampe III

An 80.0 g. portion of the extract polybasic acids having an acid number of 214, a mol. wt. of 410, and containing 4.80% unsaponifiables was dissolved in 150 ml. of toluene, and 20 ml. aliquots of this solution were precipitated with different amounts of n-heptane. The resulting precipitates were individually filtered, washed with n-heptane and dried. The solute remaining in each filtrate was recovered by distilling off the mixed toluene-heptane solvent. The fractions so derived were characterized as follows:

TABLE VI

| Fraction No. | Amount of n-Heptane Used (ml.) | Precipitate | | | | Filtrate | | | |
|---|---|---|---|---|---|---|---|---|---|
| | | g. | Acid No. | Mol. Wt. | —COOH/Mol. | g. | Acid No. | Mol. Wt. | —COOH/Mol. |
| Charge | | | 214 | 410 | 1.57 | | | | |
| 1 | 15 | 0.82 | 300 | 435 | 2.33 | 6.17 | 193 | 420 | 1.44 |
| 2 | 30 | 2.04 | 290 | | | 5.11 | 182 | | |
| 3 | 45 | 2.48 | 292 | 425 | 2.21 | 4.78 | 174 | 415 | 1.29 |
| 4 | 75 | 3.00 | 289 | | | 4.22 | 157 | | |
| 5 | 125 | 3.12 | 287 | 420 | 2.14 | 4.14 | 156 | 415 | 1.15 |
| 6 | 250 | 3.18 | 286 | | | 4.22 | 153 | | |

Filtrate fraction numbers 1 through 6 and, particularly filtrate fraction numbers 4, 5 and 6 of Table VI are illustrative species of predominantly monocarboxylic acids to be used as stabilizers in accordance with this invention.

In accordance with application Ser. No. 247,358 selected fractions of the carboxylic acids are obtained by (1) dissolving the complex mixture of acids to be fractionated in an excess of aqueous caustic; (2) adding saturated salt solution and ether to effect a three phase separation; (3) separating the phases; and (4) separating the acids from each of the phases by individual acidification. By this method a middle phase comprising an ether-water solution of predominantly monocarboxylic complex acids, useful in accordance with this invention, is obtained.

*Example IV*

A 2.17 g. portion of an extract polybasic acid was pulverized and dissolved in 60 ml. of water containing 9.45 g. $NaOH_3$ and 25 ml. of ether. This mixture was poured into a separatory funnel containing 100 ml. additional ether and shaken vigorously. Then 62 ml. of saturated NaCl solution (containing 17.7 g. of NaCl) was added and the mixture was shaken vigorously for two minutes. After settling, a three-phase system emerged: a light yellow upper phase consisting of unsaponifiables in ether; dark brown middle phase consisting of sodium salts of monobasic acids (including naphthenic acids) dissolved in ether-water mixture; a lower phase containing a water solution of sodium salts of di-, tri-, and higher polybasic acids. The phases were separated and acidified separately with HCl, and the organic acids released were extracted with ether. Each ether extract was dried, yielding the products described below:

TABLE VIII

| | Original Charge | Fractional Products | | |
|---|---|---|---|---|
| | | From Upper phase | From Middle phase | From Lower phase |
| Wt. (g.) | 13 43 | 0.44 | 9.21 | 3.78. |
| Percent of Charge | 100 | 3.3 | 68.6 | 28.1. |
| Acid No. of Fraction | 218 | 18 | 178 | 309. |
| Equivalent Wt. | 257 | | 315 | 181. |
| Appearance | Dark Brown Color, Crystalline. | Yellow color, soft solid. | Very Dk. Brown, Soft gummy product. | Amber Color Crystalline. |
| Essential Composition. | Mixture of Mono-, Di-, Tri-, and higher polybasic acids. | Unsap. Color Bodies. | Monobasic Acids (incl. Naphthenic acids). | Di-, Tri-, and higher polybasic acids. |

2.39 g. NaOH and 10 ml. ether. This mixture was poured into a separatory funnel containing 60 ml. additional ether, and shaken vigorously. Then, 10.2 ml. of saturated NaCl solution (containing 2.96 g. NaCl) was added, and the mixture was shaken vigorously for 2 minutes. After settling, a three-phase system emerged: a light-yellow, upper phase, consisting of unsaponifiables in ether; a dark-brown middle phase, consisting of sodium salts of monobasic acids (including naphthenic acids) dissolved in ether-water mixture; a lower phase containing a water solution of sodium salts of di-, tri- and higher polybasic acids. Then, the phases were separated and acidified separately with HCl, and the organic acids released were extracted with ether. Finally, each ether extract was dried, yielding the products in the tabulation below:

*Example VI*

A 3.22 portion of extract polybasic acid was pulverized and dissolved in 10 ml. of water contaniing 3.3 g. of NaOH and 10 ml. of ether, this mixture was poured into a separatory funnel containing 100 ml. additional ether, and the funnel was shaken vigorously. Then, 20 ml. of saturated NaCl solution (containing 5.7 g. of NaCl) was added and the mixture was shaken vigorously for 2 minutes. After settling, a three phase system emerged: a light yellow upper phase consisting of unsaphonifiables in ether; a dark brown middle phase consisting of sodium salts of monobasic acids (including naphthenic acids) dissolved in ether-water mixture; a lower phase containing a water solution of sodium salts

TABLE VII

| | Original Charge | Fractional Products | | |
|---|---|---|---|---|
| | | From Upper phase | From Middle phase | From Lower phase |
| Wt. (g.) | 2.17 | 0.16 | 1.03 | 0.98. |
| Percent of Charge | 100 | 7.3 | 47.5 | 45.2. |
| Acid No. | 218 | 37 | 160 | 245. |
| Equivalent Wt. | 257 | | 351 | 229. |
| Appearance | Dark Brown, Crystalline. | Yellow, soft solid | Very dark brown gummy prod. | Amber Color Crystalline. |
| Essential Composition. | Mix. of Mono-, Di-, Tri- and higher polybasic acids. | Unsap | Monobasic Acids incl. Napthenic acids. | Di-, Tri-, and higher polybasic acids. |

*Example V*

A 13.43 g. portion of an extract polybasic acid was pulverized and dissolved in 250 ml. of water containing of di-, tri-, and higher polybasic acids. Each phase was separated and acidified separately with HCl, and the organic acids released were extracted with ether. Finally each ether extract was dried, yielding the products described below:

TABLE IX

| Original Charge | | Fractional Products | | |
|---|---|---|---|---|
| | | From Upper phase | From Middle phase | From Lower phase |
| Wt. (g.) | 3.22 | 0.12 | 2.10 | 1.00. |
| Percent of Charge | 100 | 3.7 | 65.2 | 31.1. |
| Acid No. of Fraction | 218 | 22 | 175 | 296. |
| Equivalent Wt. | 257 | | 321 | 190. |
| Appearance | Dk. Brown Color, Crystalline. | Yellow, Soft Solid | Very Dk. Brown Soft, Gum. Product. | Amber Color Crystalline. |
| Essential Composition. | Mixture of Mono-, Di- Tri-, and and Higher polybasic acids. | Unsap. Color Bodies. | Monobasic Acids (incl. naphthenic acids). | Di-, Tri-, and higher Polybasic acids. |

*Example VII*

An 0.84 g. portion of extract polybasic acid was pulverized and dissolved in 30 ml. of water containing 0.93 g. of NaOH and 5 ml. of ether, this mixture was poured into a separatory funnel containing 30 ml. additional ether, and the funnel was shaken vigorously. Then, 6 ml. of saturated NaCl solution (containing 1.7 g. of NaCl) was added, and the mixture was shaken vigorously for 2 minutes. After settling, a three-phase system emerged; a light yellow upper phase consisting of unsaponifiables in ether; a dark brown middle phase consisting of sodium salts of monobasic acids (including naphthenic acids) dissolved in ether-water mixture; a lower phase containing a water solution of sodium salts of di-, tri-, and higher polybasic acids, phases were separated and acidified individually with HCl, and the organic acids thus released were extracted with ether. Each ether extract was dried, yielding the products described below:

TABLE X

| Original Charge | | Fractional Products | | |
|---|---|---|---|---|
| | | From Upper phase | From Middle phase | From Lower phase |
| Wt. (g.) | 0.84 | 0.10 | 0.40 | 0.34. |
| Percent of Charge | 100 | 11.9 | 47.6 | 40.5. |
| Acid Number | 263 | 39 | 166 | 295. |
| Equivalent Weight | 213 | | 338 | 190. |
| Appearance | Dk. Brown Color, Crystalline. | Yellow Color | Very Dk. Brown; soft, gum. product | Amber Color Crystalline. |
| Essential Composition. | Mixture of Di-, Tri- and higher polybasic acids and unsap. | Unsap. and color bodies. | Monobasic acids, incl. naphthenic caids. | Di-, Tri-, and higher polybasic acids. |

*Example VIII*

A 6.1 g. portion of extract polybasic acid, having an acid number of 206, was dissolved in 200 ml. of tetrahydrofuran and neutralized with a calculated amount of sodium hydroxide (0.89 g.) in 200 ml. of water. There was no separation of phases. Addition of a considerable amount of sodium chloride resulted in a separation of 20 layers. Phases were then separated and independently acidified. Each acidified product was extracted with ether and the extract stripped. The two products were characterized as follows:

TABLE XI

| Original Charge | | Fractional Products | |
|---|---|---|---|
| | | From Upper Layer | From Lower Layer |
| Wt. (g.) | 6.1 | 3.3 | 2.8. |
| Percent of Charge | 100 | 54 | 46. |
| Acid Number | 206 | 150 | 230. |
| Equivalent Wt | 272 | 374 | 244. |
| Appearance | Dk. Brown | Gray | |
| Essential Composition. | Mixture of Mono-, Di, Tri- and higher polybasic acids and Unsap. | Monobasic Acids and Unsap. | Di, Tri-, and Higher polybasic Acids. |

The middle phases shown in Tables VII, VIII, IX, X and XI are examples of monocarboxylic acids useful as stabilizers in accordance with this invention.

THE COMPLEX ESTER STABILIZERS

The monomeric esters of the complex carboxylic acid fractions are prepared by subjecting the acids to esterification with a stoichiometric amount of a monohydric alcohol having 1 to 20 carbon atoms, as hereinafter defined, under known esterification conditions. This process is described in detail in copending application Serial No. 822,992 (now U.S. Patent 3,128,302), wherein the esters are formed by reaction of the mixed complex carboxylic acids with a monohydroxyl-organic compound, present in at least stoichiometric amounts, at temperatures from 100 to 250° F., and allowing sufficient time to withdraw the water vapor formed from the esterification. The following examples are illustrative.

*Example IX*

500 g. of complex acids (Sap. No. 221; avg. mol. wt. 630) resulting from the treatment of a solvent extract with sodium at −30° C. in the presence of tetrahydrofuran as the reaction solvent and carbonation at the same temperature, and which had been stripped of solvent, water-washed and acidified, were reacted with 370 g. of n-butanol, under reflux, while withdrawing water vapor until 35 g. of water was removed. The excess butanol was distilled off, producing a brown, fluid residue of the monomeric butyl ester which is non-volatile at 180° C. at 2 mm. Hg pressure. Other examples of esters that can be used in accordance with this invention are the stearyl, phenol, naphthyl, beta-naphthyl and methyl esters described in said U.S. Patent 3,128,302.

*Example X*

Another example is the preparation of the butyl ester of complex acid No. 101 of Table III, by reaction of 30 g. of the mixed mono-di-acid with 150 ml. of n-butanol in the presence of 0.5 g. of p-toluene sulfonic acid at reflux temperature (118° C.) for 18 hours. The reaction mixture was diluted with ether and water-washed to free same of catalyst. The catalyst-free ether solution was distilled to remove the solvent and unreacted butanol, leaving the butyl ester as the residue.

Another example is the product produced by the foregoing method using the acid fraction No. 5 shown in Table VII. Also the various monocarboxylic acids shown in Tables VII through XI can be similarly esterified.

From the foregoing examples it is apparent that the stabilizing agents of this invention are defined by the formula $$R(COOR')_n$$

wherein R is the complex nuclei of solvent extracts, FCC recycle stock or hydrogenated solvent extracts, $n$ has a value of 1 to 2 and preferably 1, R' is a member of the group of hydrogen and hydrocarbon radicals having 1 to 20 carbon atoms illustrated by methyl, ethyl, propyl, butyl, t-butyl, isobutyl, amyl, isoamyl, hexyl, heptyl, octyl, nonyl, dodecyl, tridecyl, up to octadecyl and eicosyl radicals, in the aliphatic series, cycloaliphatic radicals such as cyclopropyl, cyclobutyl, cyclopentyl, cyclohexyl and cycloheptyl aromatic radicals having 6 to 10 carbon atoms, i.e., phenyl and naphthyl radicals, alkyl aromatic radicals comprising combinations of the aforementioned alkyl or cycloalkyl and the aryl radicals, aralkyl combinations of the same, and the like. A preferred sub-genus of esters and acids are those wherein $n$ has a value of 1 and R' is $C_1$–$C_{20}$ aliphatic; and wherein $n$ is 1 and R' is hydrogen, the latter representing the predominantly monobasic acid fraction.

Thus the esters are formed from such alcohols as methyl, ethyl, propyl, butyl, amyl, hexyl, octyl, n-decyl, lauryl, myristyl, cetyl and stearyl alcohols and cyclohexanol, benzyl alcohol, phenol, naphthol, cresols, methyl naphthols, ethyl naphthols, benzhydrol, triphenyl carbinol, xylenols, monoethanolamine, diethanolamine, triethanolamine, aryl alcohol. The esterification reaction proceeds more readily with primary alcohols and is slower with secondary alcohols and tertiary alcohols.

The acids and their esters are further defined by the process of preparing same and their chemical characteristics, i.e., mol wt., sulfur content and aromaticity.

Without limiting the invention, the characteristics of the products of this invention as influenced by the complex acids and their esters are further disclosed as thus far evaluated. In one aspect, the mono-, and a small amount of a dicarboxylic acid used are mixtures of acids of the dihydronaphthalene, dihydrophenanthrene, and dihydroanthracene types, averaging in molecular weight from about 375 to 450 and as high as 750, having several alkyl and/or cycloalkyl groups in each aromatic nucleus wherein the sum of the carbon atoms in the alkyl substituents varies between 5 and 22, and having acid numbers of 100 to 200 and preferably 100 to 180. Despite the size of the acid molecules, the linkages through or between the carboxyl groups are about the same as those of phthalic and terephthalic acids. Some of the aromatic rings or condensed aromatic rings are probably further condensed with naphthenic rings to form configurations similar to the steroid ring system. Complex carboxylic acids from solvent extracts, obtained in the production of bright stocks, probably contain more highly condensed aromatic structures. Most of the sulfur (1.9 to 3.2% or 4.5% total sulfur being present) is in the form of heterocyclic rings with carbon, associated with both the aromatic-type and naphthenic-type structures present. Only trace amounts of the sulfur are present as high-molecular-weight aliphatic sulfides. The nitrogen content of distilled solvent extracts is 0.01 to 0.04%. Analysis for the types of carbon linkages as percent $C_a$ (carbon atoms in aromatic configuration) and percent $C_n$ (carbon atoms in naphthenic configuration), gives results ranging from about 30–40% $C_a$, 20–35% $C_n$ and 31–47% $C_p$ using the method of Kurtz, King, Stout, Partikan and Skrabek (Anal. Chem. 28, 1928 (1956)). The complex monocarboxylic acids used in accordance with this invention have the following typical properties: acid numbers (1948 method) of from 120–200; M.P. 80–90° C.; Br. No. 4–24; sulfur 1.0–2.3%; are deep red in color, transparent in thin sheets, and contain 2–6% unsaponifiables. They are soluble in ethylether, acetone, methylethyl ketone, tetrahydrofuran, benzene, toluene and xylene. In order to demonstrate the stabilizing effect of these complex acids and their esters the following experiments are described.

*Example XI*

Fifty grams of polybasic acids (No. 101 in Table III, A.N. 168; mol wt., 405; percent unsaponifiable, 9) were dissolved in a mixture of 20 ml. benzene and 200 ml. n-pentane. The solution was cooled to −50° C. and filtered quickly. The filtrate was vacuum stripped and the resulting acid (MBA) had an A.N. of 137. The DDT used was a technical grade DDT that had been recrystallized from acetone.

A saturated DDT-kerosene solution was prepared at room temperature and contained 8% wt. DDT. The kerosene used for the preparation of the DDT solution had the following properties:

TABLE XII

| | |
|---|---:|
| Boiling range, ° F. | 351–530 |
| Flash Point, ° F. | 139 |
| Kauri-butanol No. | 25 |
| Aniline No., ° F. | 151.2 |
| Refractive Index, 20° C. | 1.4500 |
| API gravity, 60° F. | 43.5 |
| Color (NPA) | +27 |

This solution was divided into several fractions, and different amounts of the monocarboxylic acid fraction (MBA) were added to the samples. To another series of DDT solutions, an acid identified as "E" (a dimer acid and a proprietary product) was added to illustrate a prior art stabilizer. After the stabilizers were completely dissolved, 4 ml. of each of the samples was put into small test tubes (I.D.=11 mm.). Each sample was seeded with a crystal of DDT and placed into a freezer, where the temperature was kept at −21 ±1° C. The samples were periodically checked, and as soon as enough material had crystallized out, the test tubes were centrifuged at each inspection for 3 minutes to determine the amount precipitated in millimeters. The results are given in the following table:

followed by neutralization with soda, water washing and filtration through an adsorbent clay.

TABLE XIII

| Sample No. | Stabilizer | Stab. Conc. (Wt. Percent) | Amount crystallized (mm.) after | | | | | | |
|---|---|---|---|---|---|---|---|---|---|
| | | | 2.5 | 4.5 | 9.5 | 21 hours | 50 | 100 | 200 |
| 1 | None | | Trace | 6 | 8 | 9 | 10 | 10 | 10. |
| 2 | MBA | 0.5 | Clear | Trace | 3 | 5 | 5 | 6 | 6. |
| 3 | MBA | 1.0 | do | do | 2 | 4 | 4 | 5 | 5. |
| 4 | MBA | 2.0 | do | Clear | Trace | 2 | 2 | 4 | 4. |
| 5 | MBA | 5.0 | do | do | Clear | Trace | Trace | Trace | 1-2. |
| 6 | MBA | 10.0 | do | do | do | Clear | Clear | Clear | Clear. |
| 7 | "E" | 0.5 | Trace | 6 | 8 | 11 | 13 | 15 | 15. |
| 8 | "E" | 1.0 | do | 6 | 8 | 10 | 12 | 14 | 14. |
| 9 | "E" | 2.0 | do | 6 | 8 | 10 | 11 | 13 | 13. |
| 10 | "E" | 5.0 | do | 5 | 6 | 11 | 13 | 13 | 14. |
| 11 | "E" | 10.0 | do | Trace | 4 | 11 | 13 | 16 | 16. |
| 12 | MBA-n-butylester [1] | 1.0 | Clear | Clear | Trace | 1 | 2 | 2-3 | 2.3. |
| 13 | MBA-n-butylester | 2.0 | do | do | Clear | Trace | 1 | 2 | 2. |
| 14 | do | 5.0 | do | do | do | Clear | Trace | Trace | Trace. |

[1] The n-butylester of MBA was prepared by a conventional esterification method using n-butyl alcohol and the above MBA as in Example X.

The foregoing examples illustrate that small amounts of the complex acids or esters thereof have the ability of retarding, if not eliminating, the precipitation of DDT from hydrocarbon solutions. Additional illustrative compositions are:

TABLE XIV

| Ingredient | Toxicant Compositions (Wt. Percent) | | | | | | |
|---|---|---|---|---|---|---|---|
| | 1 | 2 | 3 | 4 | 5 | 6 | 7 |
| DDT | 9.0 | 15 | | 5.0 | | | 7.0 |
| 2,4-D | | | 10 | | | | 8.0 |
| Dieldrin | | | | | 14.0 | | |
| Methoxychlor | | | | 5.0 | | 9.5 | |
| Kerosene | 90.0 | | | 10.0 | 80.0 | | |
| Gasoline | | | 85 | | | | 25.0 |
| Naphtha | | 83.0 | | 70.0 | | | |
| Stoddard Solvent | | | | | | 80.5 | 58.5 |
| MBA | 1.9 | | | | | | 1.5 |
| Propyl ester of MBA | | 2.0 | | | | | |
| Phenyl ester of MBA | | | 5.0 | | | | |
| Naphthyl ester of MBA | | | | 10.0 | | | |
| Octyl ester of MBA | | | | | | 6.0 | |
| Stearyl ester of MBA | | | | | 10.0 | | |

A wide variety of petroleum solvents or hydrocarbon solvents can be used as the vehicle of the compositions of this invention. The solubility of the toxicants increases with increased cyclic nature and aromaticity of the solvent, as does the phytotoxicity, skin irritation and expense. In using predominantly aliphatic hydrocarbons as the vehicle, it is essential for purposes of the solubility of the toxicant therein that the solvent contain at least about 15% by volume of aromatic or cyclic compounds such as benzene, toluene, the xylenes, dimethylbenzenes, trimethyl benzenes, ethylbenzene, monomethylnaphthalenes, dimethylnaphthalenes, trimethylnaphthalenes, tetramethylnaphthalenes, ethylnaphthalenes, pine oil, terpenic hydrocarbons, cycloaliphatic compounds such as cyclopentane, cyclobutane, methylcyclopentane, dimethylcyclopentane, ethylcyclopentane, cyclohexane, methylcyclohexane, dimethylcyclohexane, cycloheptane and related compounds.

The aliphatic portion of the solvent contains liquid aliphatic hydrocarbons such as pentane, hexane, isopentane, isohexane, heptane, octane and nonane and naphthas, Stoddard solvent, kerosene, gas oil, alkylates and related hydrocarbon mixtures, all of which boil in the range of about 170° F. to 760° F. One preferred species of solvent is deodorized kerosene, a neutral, inert white oil usually consisting of alkylated cycloparaffins and a small amount of paraffins. Deodorized kerosene is usually prepared by the action of fuming sulfuric acid on a kerosene distillate fraction at about 90° to 160° F., The temperature (−21° C.) at which the tests reported herein were run is sufficiently low to assure that when only a trace of precipitate appeared at the end of 4½ hours, as in sample numbers 2 and 3 of Table XIII, sufficient protection is provided to assure stable concentrates under normal shipping, handling and storage conditions. Accordingly, the compositions of this invention meet the objective of stabilizing the toxicant against precipitation from concentrated solutions at low temperature, that is, the length of time that the toxicant solution may be subjected to temperatures low enough to cause it to be saturated or supersaturated without separation of the toxicant is greatly increased. Furthermore, when such crystals finally separate from the compositions of this invention, they are formed in small quantities only, remain suspended in the solution, and quickly redissolve when the toxicant mixture is warmed to ordinary room temperature, or about 70° F.

Through a study of the physical and chemical properties of the acids and esters described herein a representative structure of monocarboxylic acid fraction is:

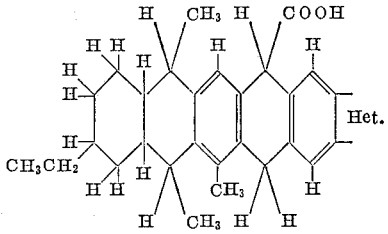

wherein "Het." represents a heterocyclic ring of S, N or O and the hydrogen of the carboxyl group can be replaced with R' as herein defined.

The embodiments of this invention in which an exclusive property or privilege is claimed are defined as follows:

1. An emulsifier composition consisting of a liquid aliphatic hydrocarbon solvent boiling in the range from about 170° F. to about 760° F. and an emulsifying amount of a compound of the group consisting of complex acids and the monomeric esters and partial monomeric esters thereof wherein:
   (1) said complex acids are produced by subjecting to metallation complex aromatic compounds having an average molecular weight from 320 to 750, from 1.9 to 4.5 weight percent sulfur and having from 1.7 to 3.5 average number of aromatic rings per molecule and being selected from the group consisting of:
      (a) solvent extracts obtained in the solvent extraction of mineral lubricating oils using a solvent selective for aromatic compounds;

(b) the refined extracts obtained by hydrogenating, dewaxing and clay-contacting of the solvent extracts of (a); and (c) the recycle stock obtained from fluid catalytic cracking of mineral oils; thereby forming the alkali metal adduct of said complex aromatic compounds; subjecting said adduct to carbonation to form the corresponding alkali metal carboxylates of said compounds; subjecting said carboxylates to acidification to form the free carboxylic acid thereof and fractionation of said free acid to recover said complex acid containing no less than 80 weight percent of monocarboxylic acids and having an acid number no greater than about 200;

(2) said monomeric ester of said complex acid is produced by reaction of said acid with a stoichiometric amount of said monohydric alcohol under esterification conditions at a temperature from about 100° to 250° F.; and (3) said partial esters of said complex acid are produced by reaction under esterification conditions of said complex acid with less than a stoichiometric amount of said monohydric alcohol.

2. An emulsifier composition in accordance with claim 1 in which said aliphatic hydrocarbon solvent is a member of the group consisting of kerosene, deodorized kerosene, gasoline, naphtha, Stoddard solvent, pentane, hexane, isopentane, isohexane, heptane, octane, nonane, and gas oil.

3. An emulsifier composition in accordance with claim 1 in which said emulsifying compound is derived from solvent extracts obtained in the solvent extraction of mineral lubricating oils using a solvent selective for aromatic compounds and said predominately monocarboxylic acid fractions therefrom are characterized by having a molecular weight of about 320 to 750, a combined sulfur content of about 1.9 to 4.5 wt. percent and an average of about 1.7 to 3.5 aromatic rings per mean aromatic molecule.

4. An emulsifier composition in accordance with claim 3 in which said emulsifier compound is a fraction of said acids containing about 80% to 100% by weight of monocarboxylic acids.

5. An emulsifier composition in accordance with claim 1 in which said emulsifier compound is derived from solvent extracts obtained in the solvent extraction of mineral lubricating oils using a solvent selective for aromatic compounds, said predominately monocarboxylic acid fractions therefrom are characterized by having a molecular weight of about 320 to 750, a combined sulfur content of about 1.9 to 4.5 wt. percent and an average of about 1.7 to 3.5 aromatic rings per mean aromatic molecule and in the form of said monomeric ester.

6. An emulsifier composition in accordance with claim 5 in which said monomeric ester is a member of the group consisting of the propyl, butyl, phenyl, naphthyl, octyl and stearyl ester.

7. An emulsifier composition in accordance with claim 5 in which said monomeric ester is the butyl ester.

8. An emulsifier composition in accordance with claim 1 in which said emulsifier compound is derived from solvent extracts obtained in the solvent extraction of mineral lubricating oils using a solvent selective for aromatic compounds, said predominately monocarboxylic acid fractions therefrom are combined sulfur content of about 1.9 to 4.5 wt. percent and an average of about 1.7 to 3.5 aromatic rings per mean aromatic molecule and in the form of the monomeric partial ester.

9. An emulsifier composition in accordance with claim 1 in which the emulsifying amount of said compound is about 0.5 to about 10% by weight of the total composition.

10. An emulsifier composition consisting of a liquid aliphatic hydrocarbon solvent boiling in the range of about 170° to about 760° F. and about 0.5 to about 10% by weight of the butyl ester of a complex mono- and dicarboxylic acids derived from solvent extracts obtained in the solvent extraction of mineral lubricating oils using a solvent selective for aromatic compounds by metalation of said solvent extracts to form the alkali metal adduct, carbonation of said adduct to form the alkali metal salt of the corresponding carboxylic acids, fractionating said acids to separate a fraction predominating in said mono- and dicarboxylic acids characterized by having a molecular weight of about 320 to 750, a combined sulfur content of about 1.9 to 4.5 wt. percent and an average of about 1.7 to 3.5 aromatic rings per mean aromatic molecule, and reaction of said acid fraction with a butyl alcohol at a temperature of about 100° to 250° F. under esterification conditions.

11. An emulsifier composition in accordance with claim 10 in which said hydrocarbon solvent is deodorized kerosene.

References Cited by the Examiner

UNITED STATES PATENTS

| | | | |
|---|---|---|---|
| 2,302,070 | 11/1942 | Stirton et al. | 252—354 |
| 2,447,475 | 8/1948 | Kaberg et al. | 167—43 |
| 2,509,233 | 5/1950 | Kaberg et al. | 167—43 |
| 2,724,697 | 11/1955 | Lipkin | 252—354 XR |
| 2,731,338 | 1/1956 | Fike et al. | 252—354 XR |
| 2,785,135 | 3/1957 | Mathews et al. | 252—354 XR |
| 3,071,550 | 1/1963 | Altscher et al. | 252—354 |
| 3,128,302 | 4/1964 | Martinek | 252—486 XR |
| 3,153,087 | 10/1964 | Kramer et al. | 260—327 XR |

LEON D. ROSDOL, *Primary Examiner.*

JULIAN S. LEVITT, JULIUS GREENWALD, ALBERT T. MEYERS, *Examiners.*

D. B. MOYER, J. T. FEDIGAN, *Assistant Examiners.*